(12) United States Patent
Mihoya et al.

(10) Patent No.: US 12,704,703 B2
(45) Date of Patent: Aug. 11, 2026

(54) SCANNING MICROSCOPE UNIT, SCANNING MICROSCOPE, AND CALIBRATION METHOD FOR SCANNING MICROSCOPE UNIT

(71) Applicant: HAMAMATSU PHOTONICS K.K., Hamamatsu (JP)

(72) Inventors: Takashi Mihoya, Hamamatsu (JP); Yasuyuki Tanabe, Hamamatsu (JP); Shunsuke Matsuda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 358 days.

(21) Appl. No.: 18/279,098

(22) PCT Filed: Jan. 12, 2022

(86) PCT No.: PCT/JP2022/000701
§ 371 (c)(1),
(2) Date: Aug. 28, 2023

(87) PCT Pub. No.: WO2022/224502
PCT Pub. Date: Oct. 27, 2022

(65) Prior Publication Data

US 2024/0134177 A1 Apr. 25, 2024
US 2024/0231067 A9 Jul. 11, 2024

(30) Foreign Application Priority Data

Apr. 21, 2021 (JP) ................................ 2021-071900

(51) Int. Cl.
*G02B 21/00* (2006.01)

(52) U.S. Cl.
CPC ....... *G02B 21/0048* (2013.01); *G02B 21/008* (2013.01)

(58) Field of Classification Search
None
See application file for complete search history.

(56) References Cited

U.S. PATENT DOCUMENTS 6,147,798 A * 11/2000 Brooker ............. G02B 21/0028 359/368
6,355,919 B1 * 3/2002 Engelhardt ........ G02B 21/0052 250/201.3

(Continued)

FOREIGN PATENT DOCUMENTS

CN 104852278 A 8/2015
CN 108227182 A 6/2018

(Continued)

OTHER PUBLICATIONS

International Preliminary Report on Patentability mailed Nov. 2, 2023 for PCT/JP2022/000701.

*Primary Examiner* — Robert E. Tallman
(74) *Attorney, Agent, or Firm* — Faegre Drinker Biddle & Reath LLP

(57) ABSTRACT

A scanning microscope unit includes: a light source for outputting irradiation light; a photodetector; a MEMS mirror for scanning an irradiation light over an observation object, and for guiding an observation light toward the photodetector; a scanning lens for guiding the irradiation light scanned by the MEMS mirror, to a microscope optical system, and for guiding the observation light imaged by the microscope optical system, to the MEMS mirror; and a frame member formed in a frame shape to define an opening, and disposed on a side of the microscope optical system with respect to the scanning lens such that the irradiation light and the observation light pass through the opening. The frame member includes a calibration portion provided in a side portion defining the opening, and for generating calibration (Continued)

light including a sensitivity wavelength of the photodetector in response to an incidence of the irradiation light.

12 Claims, 11 Drawing Sheets

(56) References Cited

U.S. PATENT DOCUMENTS

| | | | | |
|---|---|---|---|---|
| 12,216,263 | B2 * | 2/2025 | Yamashita | G02B 21/0032 |
| 2004/0178334 | A1 * | 9/2004 | Sasaki | G02B 21/002<br>250/234 |
| 2016/0313545 | A1 * | 10/2016 | Kondo | G02B 21/08 |

FOREIGN PATENT DOCUMENTS

| | | | | |
|---|---|---|---|---|
| CN | 111307269 | A | 6/2020 | |
| DE | 19906763 | A1 | 8/2000 | |
| JP | H08-240775 | A | 9/1996 | |
| JP | 2001-522479 | A | 11/2001 | |
| JP | 2002-131649 | A | 5/2002 | |
| JP | 2005-043459 | A | 2/2005 | |
| JP | 2010-262194 | A | 11/2010 | |
| JP | 2011-090248 | A | 5/2011 | |
| JP | 2013-540286 | A | 10/2013 | |
| JP | 2014-112122 | A | 6/2014 | |
| JP | 2017-044871 | A | 3/2017 | |
| JP | 2017-187755 | A | 10/2017 | |
| WO | WO-99/042885 | A2 | 8/1999 | |
| WO | WO-2012/050942 | A1 | 4/2012 | |
| WO | 2020/179032 | A1 | 9/2020 | |
| WO | 2020/179040 | A1 | 9/2020 | |
| WO | WO-2020196782 | A1 * | 10/2020 | G02B 21/24 |

* cited by examiner

A
1
2
3
4
5
7
14
50
51
52
PT
R
M
6a
6b
6c
6d
8a
8b
8c
8d
9a
9b
9c
9d
10a
10b
10c
10d
11a
11b
11c
11d
12a
12b
12c
12d
13a
13b
13c
13d (a)
DEFLECTION ANGLE
1 2 3 4 5 6 7 8 9 10 11 12 13 14 15 16 17 18 19 20 22 23 24 25 26 27 28 29 30
(b)
PHASE
1 2 3 4 5 6 7 8 9 10 11 12 13 14 15 16 17 18 19 20 22 23 24 25 26 27 28 29 30

(a)
44a(44)
40
44b(44)
43
D2
40a
40b
A1
A2
D1
(b)
40
44a(44)
44b(44)
D2
43
40a
40b
A1
A2
D1

SCANNING MICROSCOPE UNIT, SCANNING MICROSCOPE, AND CALIBRATION METHOD FOR SCANNING MICROSCOPE UNIT

TECHNICAL FIELD

One aspect of the present disclosure relates to a scanning microscope unit, a scanning microscope, and a calibration method for a scanning microscope unit.

BACKGROUND ART

Patent Literature 1 describes scanning microscope units attached to a connection port of a microscope having a microscope optical system to form a scanning microscope. The scanning microscope unit described in Patent Literature 1 includes a micro electro mechanical system (MEMS) mirror that scans irradiation light, which is output from a light source, over an observation object, and a photodetector that detects observation light generated from the observation object in response to the irradiation with the irradiation light.

CITATION LIST

Patent Literature

Patent Literature 1: International Publication WO 2020/196782

SUMMARY OF INVENTION

Technical Problem

In the scanning microscope unit as described above, in order to capture an image of a desired field of view, for example, during manufacturing, a drive signal applied to the MEMS mirror is adjusted such that the oscillation angle of the MEMS mirror with respect to the sampling timing of the photodetector becomes appropriate. However, the oscillation amplitude or phase of the MEMS mirror may change over the elapse of usage time, and in this case, there is a concern that the field of view deviates.

Therefore, one aspect of the present disclosure is intended to provide a scanning microscope unit, a scanning microscope, and a calibration method for a scanning microscope unit capable of suppressing the occurrence of a deviation in the field of view.

Solution to Problem

According to one aspect of the present disclosure, there is provided a scanning microscope unit to be attached to a connection port of a microscope including a microscope optical system to form a scanning microscope, the unit including: a light source for outputting irradiation light; a photodetector for detecting observation light generated from an observation object in response to irradiation with the irradiation light; a MEMS mirror for scanning the irradiation light output from the light source, over the observation object, and for guiding the observation light generated from the observation object in response to the irradiation with the irradiation light, toward the photodetector; a scanning lens for guiding the irradiation light scanned by the MEMS mirror, to the microscope optical system, and for guiding the observation light imaged by the microscope optical system, to the MEMS mirror; and a frame member formed in a frame shape to define an opening, and disposed on a side of the microscope optical system with respect to the scanning lens such that the irradiation light and the observation light pass through the opening. The frame member includes a calibration portion provided in a side portion defining the opening, and for generating calibration light including a sensitivity wavelength of the photodetector in response to an incidence of the irradiation light.

This scanning microscope unit includes the frame member formed in a frame shape to define the opening, and disposed on the side of the microscope optical system with respect to the scanning lens such that the irradiation light and the observation light pass through the opening. In addition, the frame member includes the calibration portion provided in the side portion defining the opening, and generating the calibration light including the sensitivity wavelength of the photodetector in response to the incidence of the irradiation light. Accordingly, for example, the irradiation light can be scanned within a scanning area on a plane along the frame member using the MEMS mirror, the calibration light generated from the calibration portion in response to the incidence of the irradiation light can be detected using the photodetector, and at least one of the amplitude and the phase of the oscillation of the MEMS mirror can be adjusted based on a detection result of the photodetector. By adjusting (calibrating) the at least one of the amplitude and the phase in such a manner, the occurrence of a deviation in the field of view as described above can be suppressed. Therefore, according to the scanning microscope unit, the occurrence of a deviation in the field of view can be suppressed.

The frame member may include a plate member for generating the calibration light in response to the incidence of the irradiation light, and a covering member disposed on the plate member to cover the plate member, and the calibration portion may be formed of a part of the plate member exposed from an exposure opening formed in the covering member. In this case, an edge of the calibration portion can be satisfactorily detected, and the accuracy of calibration can be improved. In addition, since the calibration portion can be accurately formed, the accuracy of calibration can also be improved.

The calibration portion may include a fluorescent member. In this case, calibration can be performed in a scanning microscope unit for fluorescence observation.

The photodetector may detect, as the observation light, fluorescence generated from the observation object in response to the irradiation with the irradiation light. In this case, fluorescence observation can be performed.

The frame member may include a first side portion and a second side portion facing the first side portion with the opening interposed therebetween, and the calibration portion may include a first calibration portion provided in the first side portion, and a second calibration portion provided in the second side portion. In this case, both the amplitude and the phase of the MEMS mirror can be reliably adjusted.

The calibration portion may extend along an extending direction of the side portion. In this case, the area that can be calibrated can be widened.

The frame member may include a first side portion and a third side portion extending along a direction intersecting an extending direction of the first side portion, and the calibration portion may include a first calibration portion provided in the first side portion, and a third calibration portion provided in the third side portion. In this case, not only calibration for scanning along one direction but also calibration for scanning along a direction intersecting the direction can be performed.

The MEMS mirror may scan the irradiation light within a scanning area on a plane along the frame member, and a width of the opening of the frame member may be narrower than a width of the scanning area. In this case, calibration can be performed by locating the calibration portion within the scanning area.

The MEMS mirror may be configured to be oscillatable around a first axis and a second axis, may resonantly operate around the first axis to scan the irradiation light along a first direction within a scanning area on a plane along the frame member, and may rotate around the second axis to change a scanning position in a second direction intersecting the first direction, and the calibration portion may be provided in the side portion extending along the second direction. In this case, the amplitude and the phase of an oscillation around the first axis which is for a resonant operation are likely to change; however, calibration can be performed for scanning by the oscillation around the first axis.

The scanning microscope unit of the present invention may further include: a housing to which the scanning lens is fixed; an attachment portion for attaching the housing to the connection port; and a movable portion for supporting the housing such that an angle of the housing with respect to the attachment portion is changeable. In this case, by changing the angle of the housing with respect to the attachment portion, an optical axis of the scanning lens can be aligned with the direction of an optical axis of the microscope optical system. As a result, imaging with maintained signal intensity and resolution can be realized.

The frame member may be disposed on an imaging plane of the microscope optical system. In this case, at least one of the amplitude and the phase of the oscillation of the MEMS mirror can be adjusted by scanning the irradiation light within the scanning area on the imaging plane using the MEMS mirror.

According to the present invention, there is provided a scanning microscope including: the scanning microscope unit; and a microscope including the microscope optical system and the connection port. According to the scanning microscope, the occurrence of a deviation in the field of view can be suppressed for the above-described reasons.

According to one aspect of the present disclosure, there is provided a calibration method for the scanning microscope unit, the method including: a first step of scanning the irradiation light within a scanning area on a plane along the frame member using the MEMS mirror, at least a part of the calibration portion being located within the scanning area; a second step of detecting the calibration light generated from the calibration portion in response to the incidence of the irradiation light using the photodetector; and a third step of adjusting at least one of an amplitude and a phase of an oscillation of the MEMS mirror based on a detection result of the photodetector.

In the calibration method for the scanning microscope unit, the irradiation light is scanned within the scanning area on the plane along the frame member using the MEMS mirror, the calibration light generated from the calibration portion in response to the incidence of the irradiation light is detected using the photodetector, and the at least one of the amplitude and the phase of the oscillation of the MEMS mirror is adjusted based on the detection result of the photodetector. By adjusting (calibrating) the at least one of the amplitude and the phase in such a manner, the occurrence of a deviation in the field of view as described above can be suppressed. Therefore, according to the calibration method for the scanning microscope unit, the occurrence of a deviation in the field of view can be suppressed.

Advantageous Effects of Invention

According to one aspect of the present disclosure, it is possible to provide the scanning microscope unit, the scanning microscope, and the calibration method for the scanning microscope unit capable of suppressing the occurrence of a deviation in the field of view.

DESCRIPTION OF EMBODIMENTS

Hereinafter, one embodiment of the present disclosure will be described in detail with reference to the drawings. In the following description, the same reference signs are used to denote the same or equivalent elements, and duplicate descriptions will be omitted.

Figure 1:
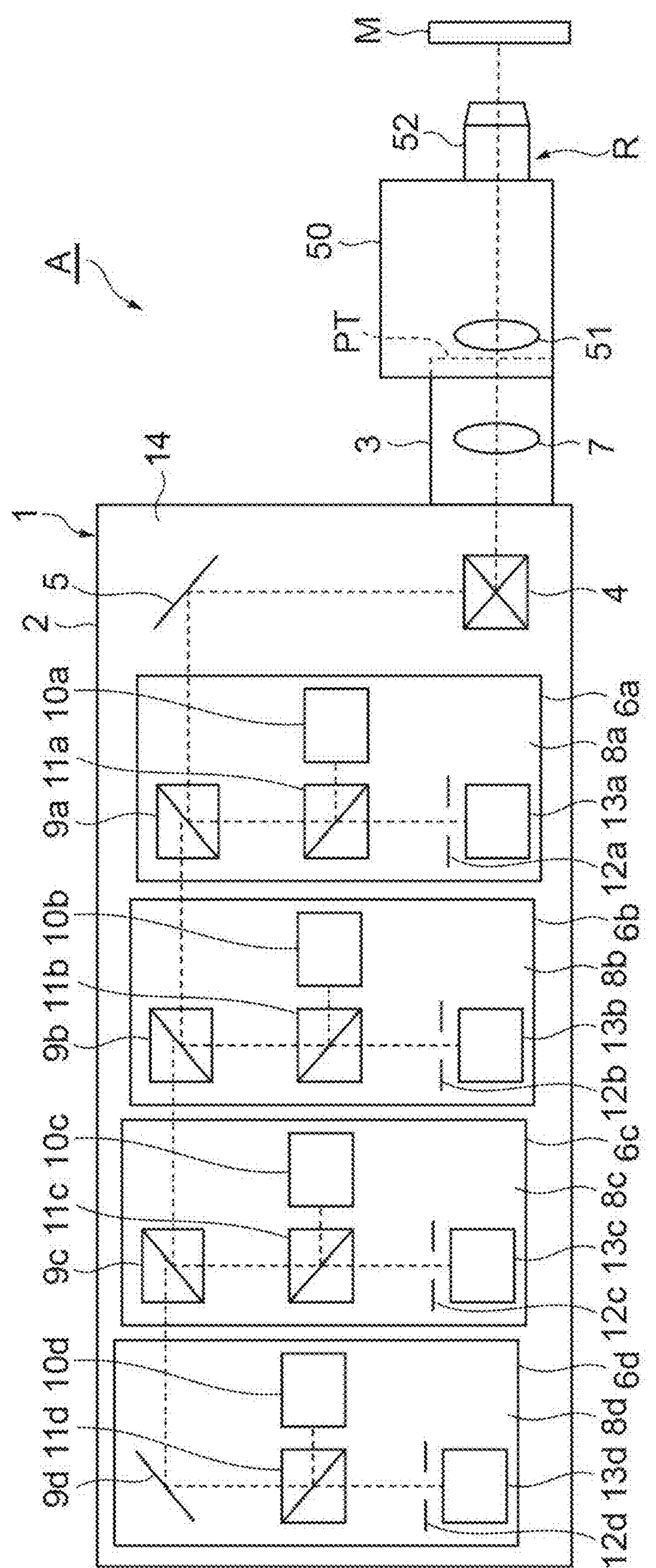
FIG. 1 is a schematic configuration view of a confocal microscope according to an embodiment.

FIG. 1 shows a confocal microscope A that is one type of scanning microscope. The confocal microscope A is used to acquire images capable of constructing an optical tomographic image of an observation object M. The confocal microscope A is configured by connecting a confocal microscope unit 1, which is a scanning microscope unit, to a connection port PT for the connection of an external unit in a microscope 50. The microscope 50 has a microscope optical system R including an imaging lens 51 and an objective lens 52. The confocal microscope unit 1 irradiates the observation object M disposed on a stage or the like of the microscope 50 with irradiation light via the microscope optical system R, receives (detects) observation light, which is generated from the observation object M, via the microscope optical system R in response to the irradiation with the irradiation light, and generates and outputs an optical tomographic image. In this example, the observation object M is a sample that generates fluorescence as observation light when irradiated with the irradiation light, and the irradiation light is excitation light for exciting the sample.

The confocal microscope unit 1 includes a main housing 2; a lens barrel (housing) 3 forming a part of the main housing 2 and detachably connected to the connection port PT of the microscope 50; a micro electro mechanical system (MEMS) mirror 4, a fixed mirror 5, and first to fourth subunits 6*a* to 6*d* fixed inside the main housing 2; and a scanning lens 7 fixed inside the lens barrel 3.

The scanning lens 7 is disposed inside the lens barrel 3. The scanning lens 7 relays a reflective surface of the MEMS mirror 4 to the pupil position of the objective lens 52, and condenses the irradiation light on a primary imaging plane of the microscope optical system R of the microscope 50. The scanning lens 7 guides the irradiation light, with which scanning is performed by the MEMS mirror 4, to the microscope optical system R to irradiate the observation object M with the irradiation light, and guides the observation light, which is generated from the observation object M in response to the irradiation, to the MEMS mirror 4. In detail, the scanning lens 7 is configured to form an image of the pupil of the objective lens 52 on the MEMS mirror 4, and guides the observation light, an image of which is formed by the objective lens 52 and the imaging lens 51 of the microscope 50, to the MEMS mirror 4.

The MEMS mirror 4 is disposed inside the main housing 2. The MEMS mirror 4 is, for example, an optical scanning element (scanning mirror) including a reflective plate configured to be oscillatable around a first axis and a second axis orthogonal to each other. The MEMS mirror 4 is formed by processing a semiconductor substrate using MEMS technology (patterning, etching, and the like). The MEMS mirror 4 scans the irradiation light, which is output from the first to fourth subunits 6*a* to 6*d*, over the observation object M, by continuously changing the angle of the reflective plate, and guides the observation light, which is generated from the observation object M in response to the irradiation with the irradiation light, to the first to fourth subunits 6*a* to 6*d*.

Figure 3:
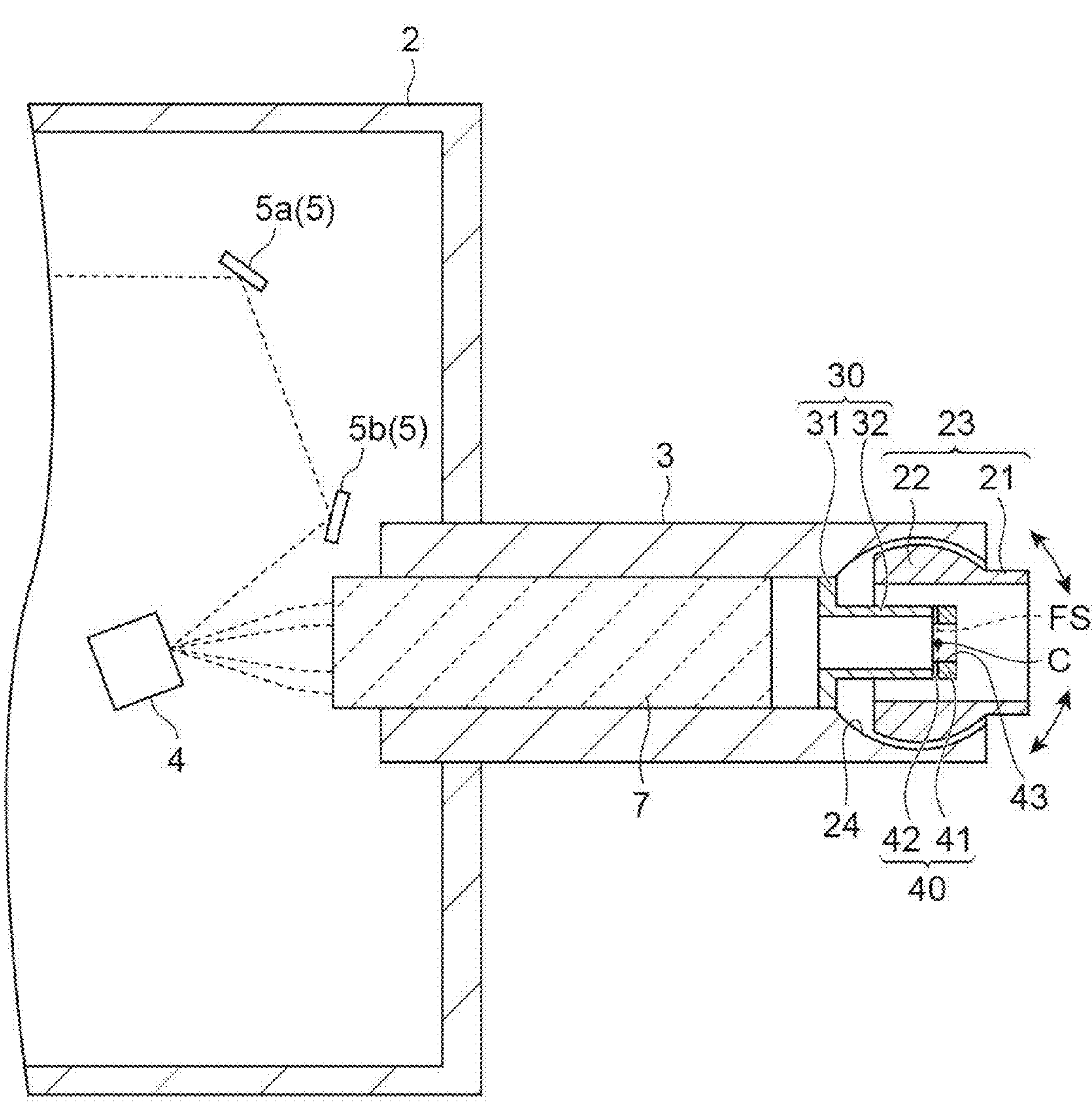
FIG. 3 is a cross-sectional view showing an attachment structure of a confocal microscope unit to a microscope.

The fixed mirror 5 is disposed inside the main housing 2. The fixed mirror 5 reflects the irradiation light, which is output from the first to fourth subunits 6*a* to 6*d*, toward the MEMS mirror 4, and reflects the observation light reflected by the MEMS mirror 4, coaxially with the irradiation light toward the first to fourth subunits 6*a* to 6*d*. As shown in FIG. 3, the fixed mirror 5 may include two fixed mirrors 5*a* and 5*b*.

The first subunit 6*a* includes a base plate 8*a*; a dichroic mirror (first beam splitter) 9*a* disposed on the base plate 8*a*; a light source 10*a*; a dichroic mirror 11*a*; a pinhole plate (first aperture member) 12*a*; and a photodetector (first photodetector) 13*a*. The dichroic mirror 9*a* is fixed on a reflection direction side of the observation light from the fixed mirror 5. The dichroic mirror 9*a* reflects a first irradiation light with a wavelength $\lambda_1$ for irradiation by the first subunit 6*a* and a first observation light in a wavelength range $\Delta\lambda_1$ generated from the observation object M in response to the irradiation with the first irradiation light, and transmits light with a longer wavelength than those of the first irradiation light and the first observation light. The dichroic mirror 11*a* is provided on a reflection direction side of the first observation light from the dichroic mirror 9*a*, transmits the first observation light, and reflects the first irradiation light.

The light source 10*a* outputs the first irradiation light. For example, the light source 10*a* is a laser diode, and the first irradiation light is laser light. The light source 10*a* is disposed such that the first irradiation light is reflected coaxially with the first observation light toward the dichroic mirror 9*a* by the dichroic mirror 11*a*. The pinhole plate 12*a* is disposed such that the pinhole position thereof coincides with the conjugate position of a spot of the first irradiation light for the observation object M, and limits a light flux of the first observation light. The pinhole plate 12*a* forms a confocal optical system, together with the light source 10*a* and the like. The pinhole plate 12*a* is configured such that the diameter of a pinhole can be adjusted from the outside, and accordingly, the resolution and signal intensity of an image detected by the photodetector 13*a* can be changed. The photodetector 13*a* has a detection surface disposed to face the pinhole plate 12*a*, and receives and detects the first observation light that has passed through the pinhole plate 12*a*. The photodetector 13*a* is a photomultiplier tube, a photodiode, an avalanche photodiode, a multi-pixel photon counter (MPPC), a hybrid photo detector (HPD), an area image sensor, or the like.

The second to fourth subunits 6*b* to 6*d* have the same construction as the first subunit 6*a*. Namely, the second subunit 6*b* includes a base plate 8*b*; a dichroic mirror (second beam splitter) 9*b*; a light source 10*b*; a dichroic mirror 11*b*; a pinhole plate (second aperture member) 12*b*; and a photodetector (second photodetector) 13*b*. The dichroic mirror 9*b* reflects a second irradiation light with a wavelength $\lambda_2$ ($>\lambda_1$) for irradiation by the second subunit 6*b* and a second observation light in a wavelength range $\Delta\lambda_2$ generated from the observation object M in response to the irradiation with the second irradiation light, and transmits light with a longer wavelength than those of the second irradiation light and the second observation light. The dichroic mirror 11*b* transmits the second observation light in the wavelength range $\Delta\lambda_2$, and reflects the second irradiation light with the wavelength $\lambda_2$ shorter than the wavelength range $\Delta\lambda_2$.

The light source 10*b* outputs the second irradiation light. The pinhole plate 12*b* is disposed such that the pinhole position thereof coincides with the conjugate position of a spot of the second irradiation light for the observation object M, and limits a light flux of the second observation light. The photodetector 13*b* has a detection surface disposed to face the pinhole plate 12*b*, and receives and detects the second observation light that has passed through the pinhole plate 12*b*.

The third subunit 6*c* includes a base plate 8*c*; a dichroic mirror (third beam splitter) 9*c*; a light source 10*c*; a dichroic mirror 11*c*; a pinhole plate (third aperture member) 12*c*; and a photodetector (third photodetector) 13*c*. The dichroic mirror 9*c* reflects a third irradiation light with a wavelength $\lambda_3$ ($>\lambda_2$) for irradiation by the third subunit 6*c* and a third observation light in a wavelength range $\Delta\lambda_3$ generated from the observation object M in response to the irradiation with the third irradiation light, and transmits light with a longer wavelength than those of the third irradiation light and the third observation light. The dichroic mirror 11*c* transmits the third observation light in the wavelength range $\Delta\lambda_3$, and reflects the third irradiation light with the wavelength $\lambda_3$ shorter than the wavelength range $\Delta\lambda_3$.

The light source 10*c* outputs the third irradiation light. The pinhole plate 12*c* is disposed such that the pinhole position thereof coincides with the conjugate position of a spot of the third irradiation light for the observation object M, and limits a light flux of the third observation light. The photodetector 13*c* has a detection surface disposed to face the pinhole plate 12*c*, and receives and detects the third observation light that has passed through the pinhole plate 12*c*.

The fourth subunit 6*d* includes a base plate 8*d*; a total reflection mirror 9*d*; a light source 10*d*; a dichroic mirror 11*d*; a pinhole plate (fourth aperture member) 12*d*; and a photodetector (fourth photodetector) 13*d*. The total reflection mirror 9*d* reflects a fourth irradiation light with a wavelength $\lambda_4$ ($>\lambda_3$) for irradiation by the fourth subunit 6*d* and a fourth observation light in a wavelength range $\Delta\lambda_4$ generated from the observation object M in response to the irradiation with the fourth irradiation light. The dichroic mirror 11*d* transmits the fourth observation light in the wavelength range $\Delta\lambda_4$, and reflects the fourth irradiation light with the wavelength $\lambda_4$ shorter than the wavelength range $\Delta\lambda_4$.

The light source 10*d* outputs the fourth irradiation light. The pinhole plate 12*d* is disposed such that the pinhole position thereof coincides with the conjugate position of a spot of the fourth irradiation light for the observation object M, and limits a light flux of the fourth observation light. The photodetector 13*d* has a detection surface disposed to face the pinhole plate 12*d*, and receives and detects the fourth observation light that has passed through the pinhole plate 12*d*.

The first to fourth subunits 6*a* to 6*d* are fixed inside the main housing 2 such that the first to fourth subunits 6*a* to 6*d* are arranged along a light guide direction of the first to fourth observation lights by the MEMS mirror 4 and the fixed mirror 5 in order in a direction away from the fixed mirror 5, and such that the dichroic mirrors 9*a* to 9*c* and the total reflection mirror 9*d* are located on optical paths of the first to fourth observation lights. In detail, the second to fourth subunits 6*b* to 6*d* are disposed to be shifted with respect to the first to third subunits 6*a* to 6*c*, respectively, by a shift distance d in a direction perpendicular to the light guide direction of the second to fourth observation lights with the center positions of the dichroic mirrors 9*a* to 9*c* and the total reflection mirror 9*d* as the references.

The shift distance d is set to be substantially equal to a shift amount δ in a direction perpendicular to the optical paths of the observation lights that the dichroic mirrors 9*a* to 9*c* have transmitted, which is caused by the refraction of the observation light at each of the dichroic mirrors 9*a* to 9*c* on the optical paths. In the present embodiment, since the thicknesses of mirror members forming the dichroic mirrors 9*a* to 9*c* are set to be the same, the shift amounts generated by the dichroic mirrors 9*a* to 9*c* are substantially the same. For this reason, the shift distance d between two subunits adjacent to each other is also set to be the same for the first to fourth subunits 6*a* to 6*d*.

Figure 2:
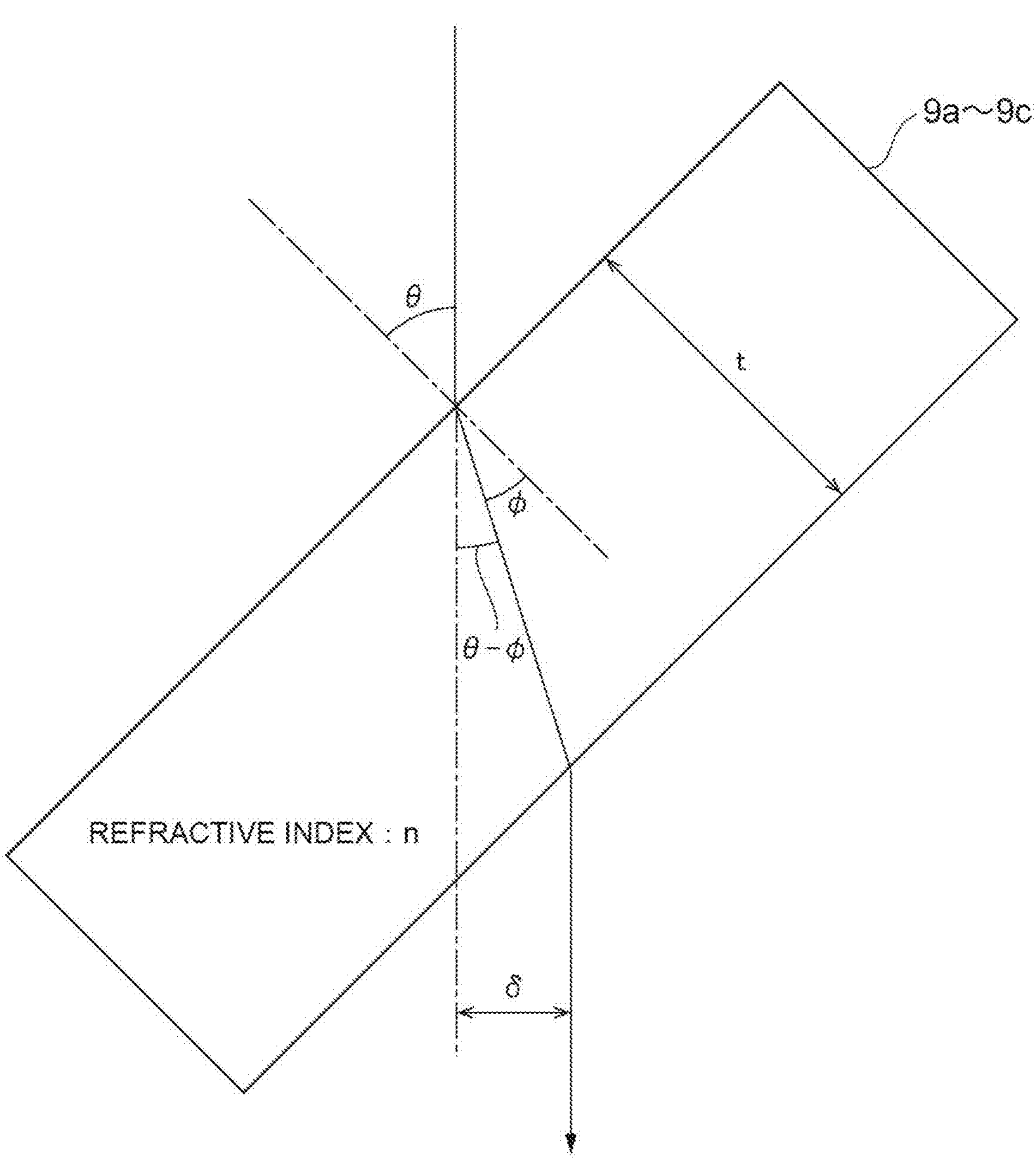
FIG. 2 is a view showing a state where observation light is refracted in a dichroic mirror.

The shift distance d is set according to the thickness and refractive index of the mirror members forming the dichroic mirrors 9*a* to 9*c*. In detail, when the thickness of the mirror members is t, the refractive index of the mirror members is n, the incident angle of the observation lights incident on the mirror members is θ, and the refraction angle of the observation lights into the mirror members is ϕ, the shift amount δ of the observation lights by the mirror members has the relationship shown in FIG. 2, and is calculated by the following equation (1). The shift distance d is set according to the shift amount δ.

$$\delta = t \cdot \sin(\theta - \phi)/\cos\phi \tag{1}$$

An attachment structure of the confocal microscope unit 1 to the microscope 50 will be described with reference to FIG. 3. As shown in FIG. 3, the scanning lens 7 is fixed inside the lens barrel 3, and a tilt adjustment mechanism 23 including an attachment portion 21 and a movable portion 22 integrated with each other is provided on an inner side of a distal end of the lens barrel 3. Although shown in a simplified manner in FIG. 3, the scanning lens 7 is actually formed of a plurality of lenses.

The attachment portion 21 is formed in a ring shape and protrudes from the distal end of the lens barrel 3, and has a structure in which the attachment portion 21 can be attached to the connection port PT for the connection of a camera of the microscope 50 (for example, a structure corresponding to a C-mount), on a distal end side. The movable portion 22 is continuous with a base end side of the attachment portion 21. The movable portion 22 is formed in a substantially ring shape, and an outer surface of the movable portion 22 forms a sliding surface having a spherical shape. A sliding surface 24 having a spherical shape and corresponding to the outer surface shape of the movable portion 22 is formed on an inner surface of a distal end portion of the lens barrel 3. Here, the outer surface of the movable portion 22 and the inner surface of the lens barrel 3 have shapes such that a center C of a sphere including these shapes is located on an imaging plane FS of the microscope optical system R of the microscope 50 in a state where the movable portion 22 is fitted into the lens barrel 3 and the attachment portion 21 is connected to the connection port PT of the microscope 50.

According to an attachment structure in which the tilt adjustment mechanism 23 is fitted into a distal end side of the lens barrel 3, by sliding the movable portion 22 against the sliding surface 24 of the lens barrel 3 in a state where the confocal microscope unit 1 is attached to the microscope 50, the angle of the lens barrel 3 with respect to the attachment portion 21 can be changed. At this time, since the outer surface of the movable portion 22 and the inner surface of the lens barrel 3 are formed in a spherical shape, the lens barrel 3 is rotatable with respect to the attachment portion 21, and the angle of a central axis of the lens barrel 3 with respect to a central axis of the attachment portion 21 can be two-dimensionally adjusted. Namely, the tilt adjustment mechanism 23 is configured to be able to change the angle of the lens barrel 3 with respect to the attachment portion 21 such that an optical axis of the microscope optical system R of the microscope 50 and an optical axis of the scanning lens 7 are parallel to each other.

A support member 30 supporting a frame member 40 is provided inside the lens barrel 3. The support member 30 forms a housing that accommodates the scanning lens 7, together with the lens barrel 3. The support member 30 includes a tubular portion 31 and a flange portion 32 having an annular shape and extending outward from a base end portion of the tubular portion 31. The support member 30 is fixed to the inner surface of the lens barrel 3 at the flange portion 32 so as to be located on an imaging plane FS side of the microscope optical system R with respect to the scanning lens 7. A distal end portion of the tubular portion 31 is located inside the movable portion 22. The frame member 40 is fixed to a distal end of the tubular portion 31, and is located inside the movable portion 22.

Figure 4:
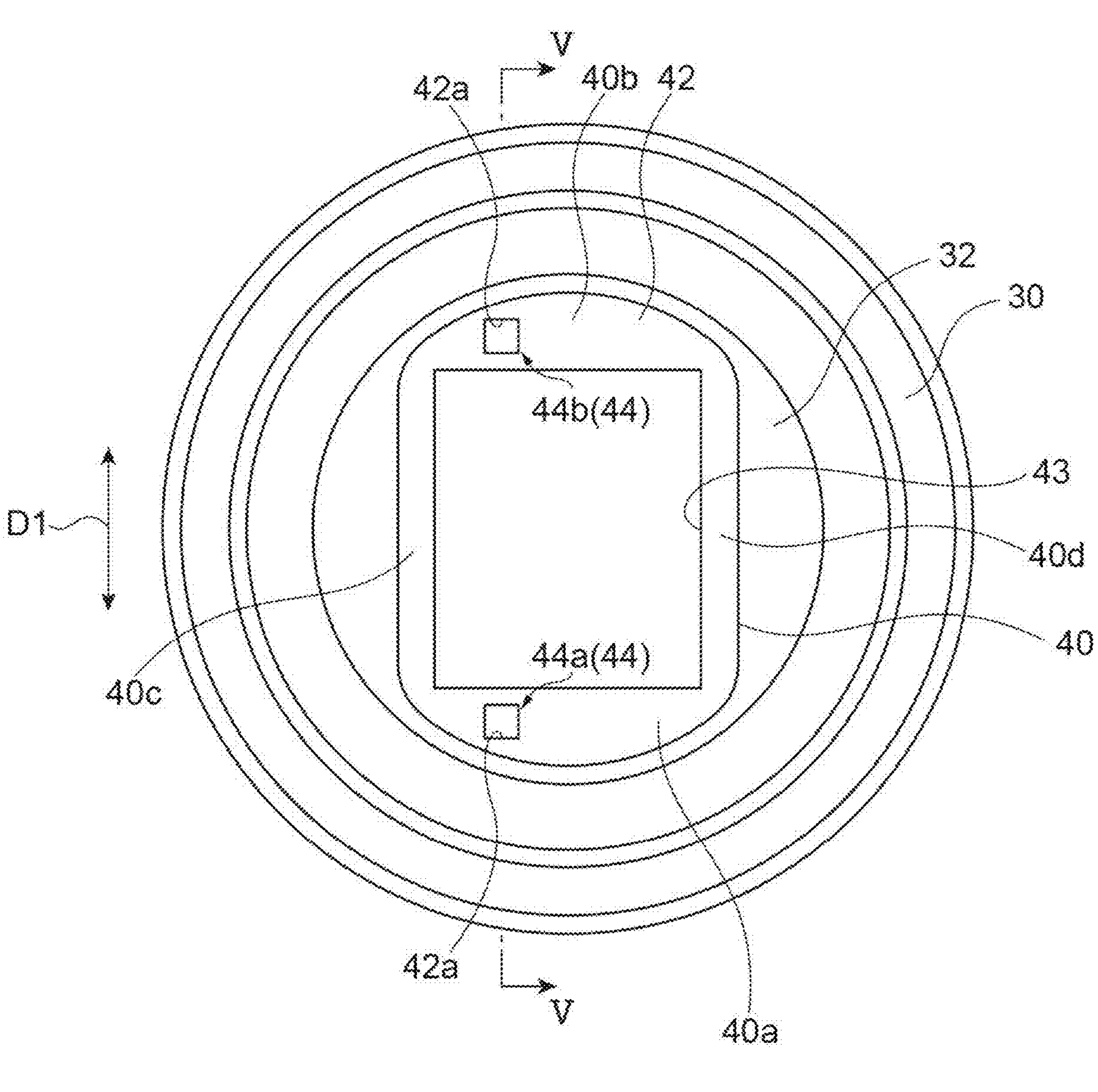
FIG. 4 is a view of a peripheral portion of a frame member when viewed from a scanning lens side.
Figure 5:
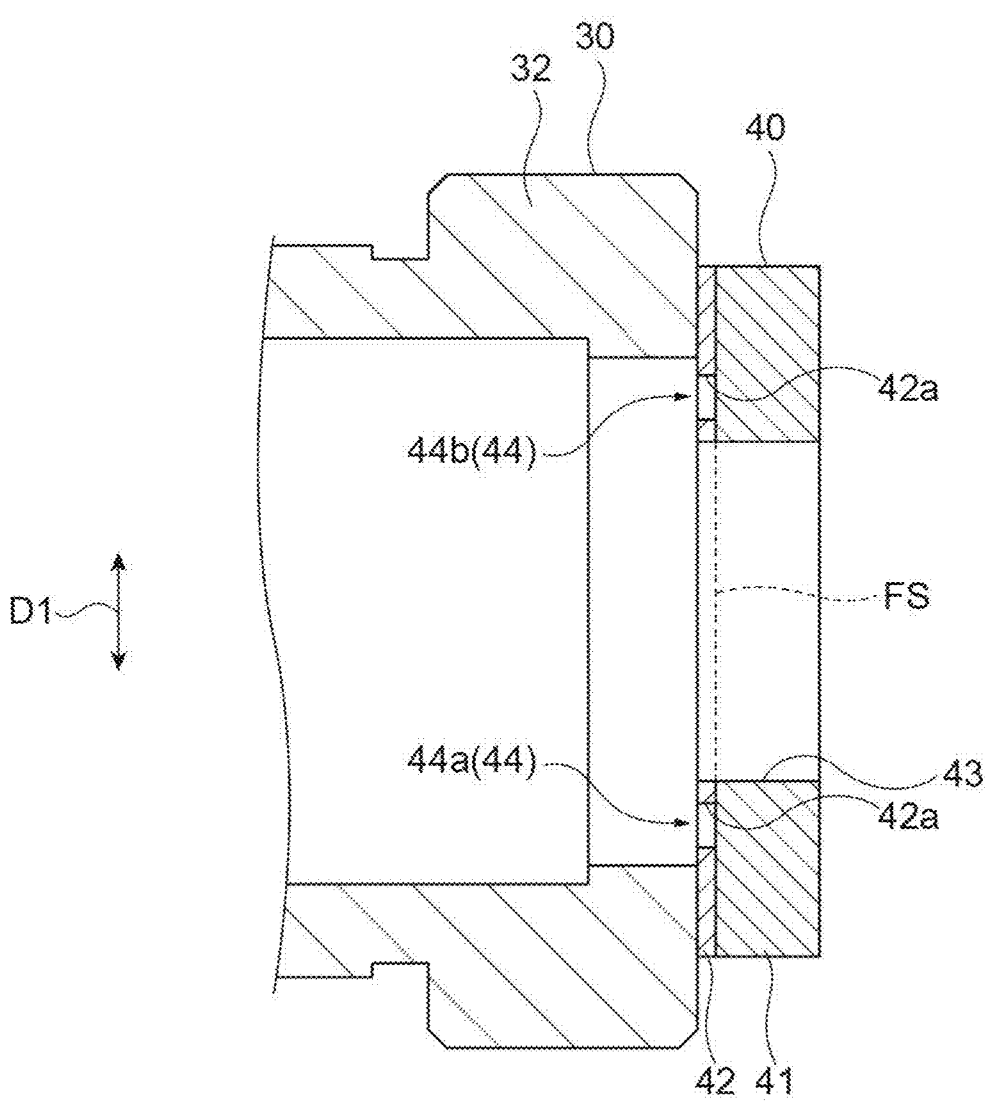
FIG. 5 is a cross-sectional view taken along line V-V of FIG. 4.

As shown in FIGS. 4 and 5, the frame member 40 includes a plate member 41 and a covering member 42. The plate member 41 is, for example, a fluorescent plate (fluorescent member) formed in a plate shape from a fluorescent material, and generates fluorescence in response to the incidence of the irradiation light. The fluorescence generated from the plate member 41 is, as will be described later, used as calibration light in calibrating the confocal microscope unit 1.

The covering member 42 is a mask member disposed on the plate member 41 to cover a surface on a support member 30 side of the plate member 41. The covering member 42 is, for example, formed in a plate shape (layer shape) from aluminum, iron, or stainless steel. A surface of the covering member 42 is subjected to blackening process (non-reflection process) for suppressing the reflection of light.

The frame member 40 has an opening 43. Namely, the frame member 40 (the plate member 41 and the covering member 42) is formed in a frame shape to define the opening 43. The frame member 40 is disposed on a microscope optical system R side (side opposite to the MEMS mirror 4) with respect to the scanning lens 7 on the optical axis of the scanning lens 7 such that the irradiation light and the observation light pass through the opening 43. More specifically, the frame member 40 is disposed on the imaging plane FS of the microscope optical system R, and a surface on a scanning lens 7 side of the plate member 41 is located on the imaging plane FS. The opening 43 is, for example, formed in an oblong shape in which a length along a first direction D1 is longer than a length along a second direction D2.

The frame member 40 includes a first side portion 40*a*, a second side portion 40*b*, a third side portion 40*c*, and a fourth side portion 40*d* that define the opening 43. The first side portion 40*a* and the second side portion 40*b* extend along the second direction D2, and face each other with the opening 43 interposed therebetween. The third side portion 40*c* and the fourth side portion 40*d* extend along the first direction D1 perpendicular to the second direction D2, and face each other with the opening 43 interposed therebetween.

Two openings (exposure openings) 42*a* having a rectangular shape are formed in the covering member 42. The two openings 42*a* are formed in respective portions of the covering member 42, the portions forming the first side portion 40*a* and the second side portion 40*b*. Since the opening 42*a* is formed, a part of the plate member 41 is exposed to the scanning lens 7 side, and the irradiation light can be incident on the part of the plate member 41. Accordingly, a calibration portion 44 that generates calibration light in response to the incidence of the irradiation light is configured. Namely, the calibration portion 44 is formed of the part of the plate member 41 exposed from the opening 42*a* formed in the covering member 42. In this example, the calibration portion 44 includes a first calibration portion 44*a* provided in the first side portion 40*a*, and a second calibration portion 44*b* provided in the second side portion 40*b*. The first calibration portion 44*a* and the second calibration portion 44*b* are located on the same straight line parallel to the first direction D1. Each of the first calibration portion 44*a* and the second calibration portion 44*b* is formed in a rectangular or square shape (square shape in this example).

Figure 6:
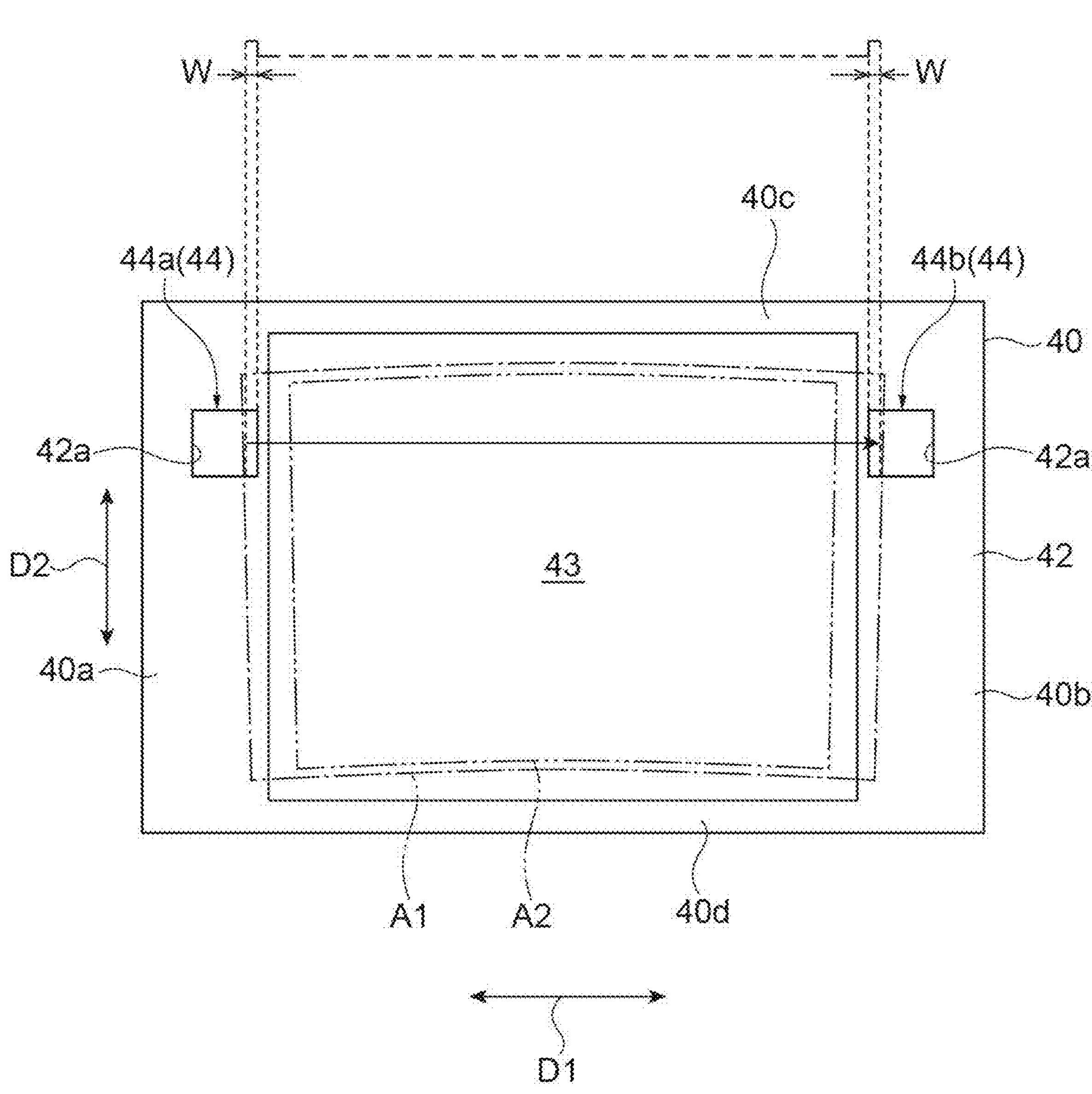
FIG. 6 is a view of the frame member when viewed in a light guide direction.

Scanning of the irradiation light by the MEMS mirror 4 will be described with reference to FIG. 6. In the confocal microscope unit 1, by rotating the MEMS mirror 4, the irradiation light is scanned within a scanning area on a plane along the frame member 40 (in this example, a plane along a surface on the scanning lens 7 side of the plate member 41, which is located on the imaging plane FS). In detail, by rotating the MEMS mirror 4 around the first axis, the irradiation light is scanned along the first direction D1 within a scanning area A1 on the imaging plane FS. In addition, by rotating the MEMS mirror 4 around the second axis, the scanning position in the second direction D2 is changed. By scanning the irradiation light along the first direction D1 while sequentially changing the scanning position in the second direction D2, the entirety of the scanning area A1 can be scanned with the irradiation light. In this example, the MEMS mirror 4 resonantly operates around the first axis (namely, oscillates at high speed at a resonant frequency level), and linearly operates around the second axis (non-resonantly operates). A width of the opening 43 of the frame member 40 in the first direction D1 is narrower than a width of the scanning area A1 in the first direction D1, and a part of an inner side of the calibration portion 44 is located within the scanning area A1. In other words, the MEMS mirror 4 is driven such that the calibration light is scanned within the scanning area A1 with a wider width than that of the opening 43, and such that at least a part of the calibration portion 44 is located within the scanning area A1.

Figure 7:
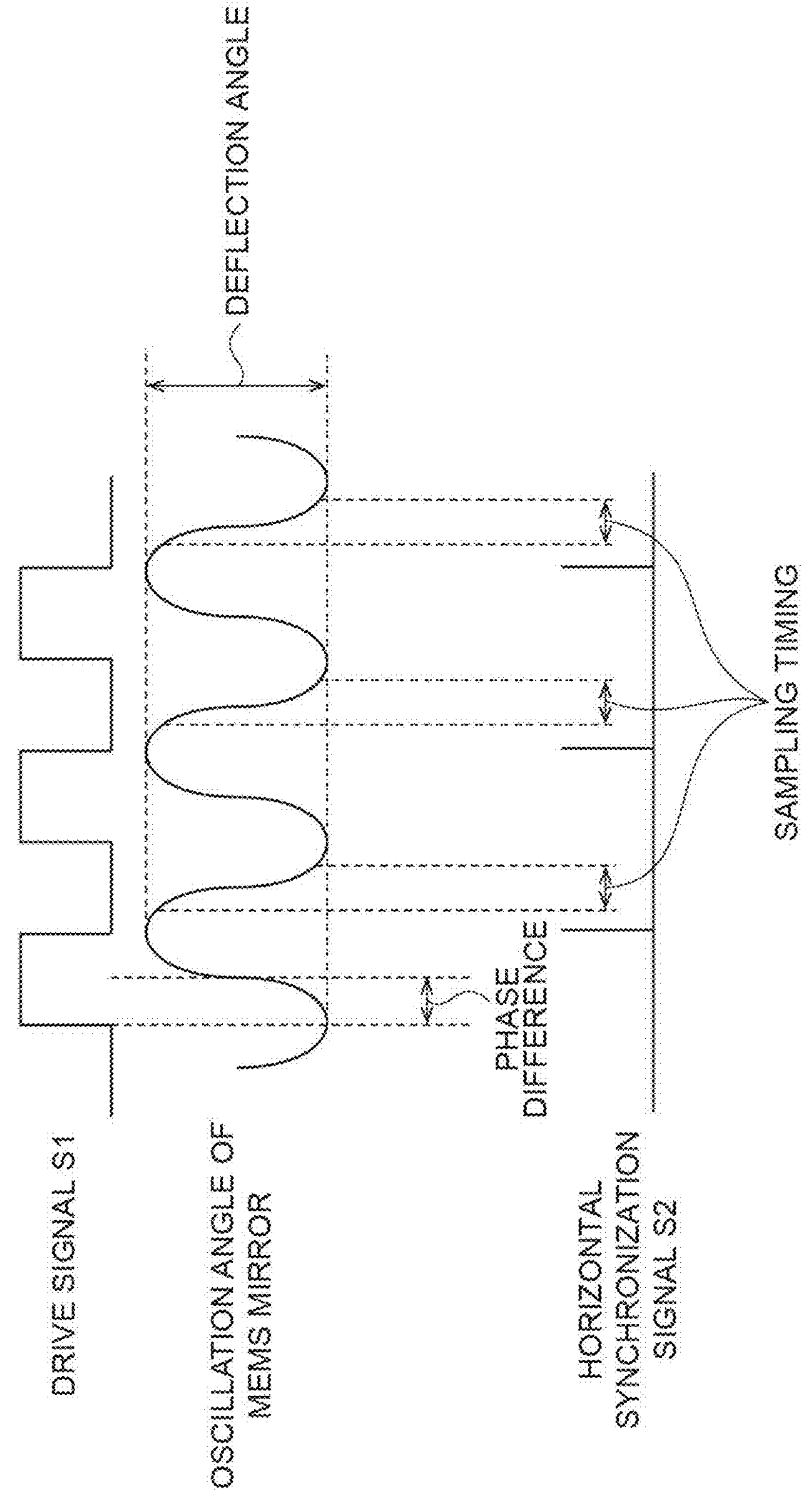
FIG. 7 is a view showing a relationship between a drive signal applied to a MEMS mirror, the oscillation angle of the MEMS mirror, and the sampling timing of a photodetector.

During observation of the observation object M, the observation light from an effective area A2 set inside the scanning area A1 is detected. For this reason, the oscillation angle of the MEMS mirror 4 with respect to the sampling timings of the photodetectors 13*a* to 13*d* is adjusted. As shown in FIG. 7, the MEMS mirror 4 operates with a deflection angle corresponding to the intensity of a drive signal S1 and with a constant phase difference from the drive signal S1. In this example, the drive signal S1 is a pulse signal. The sampling timings of the photodetectors 13*a* to 13*d* are synchronized with a horizontal synchronization signal S2, and in this example, the photodetectors 13*a* to 13*d* detect the observation light over ranges indicated by arrows in FIG. 7. Incidentally, FIG. 7 shows the oscillation angle of the MEMS mirror 4 around the first axis.

Figure 8:
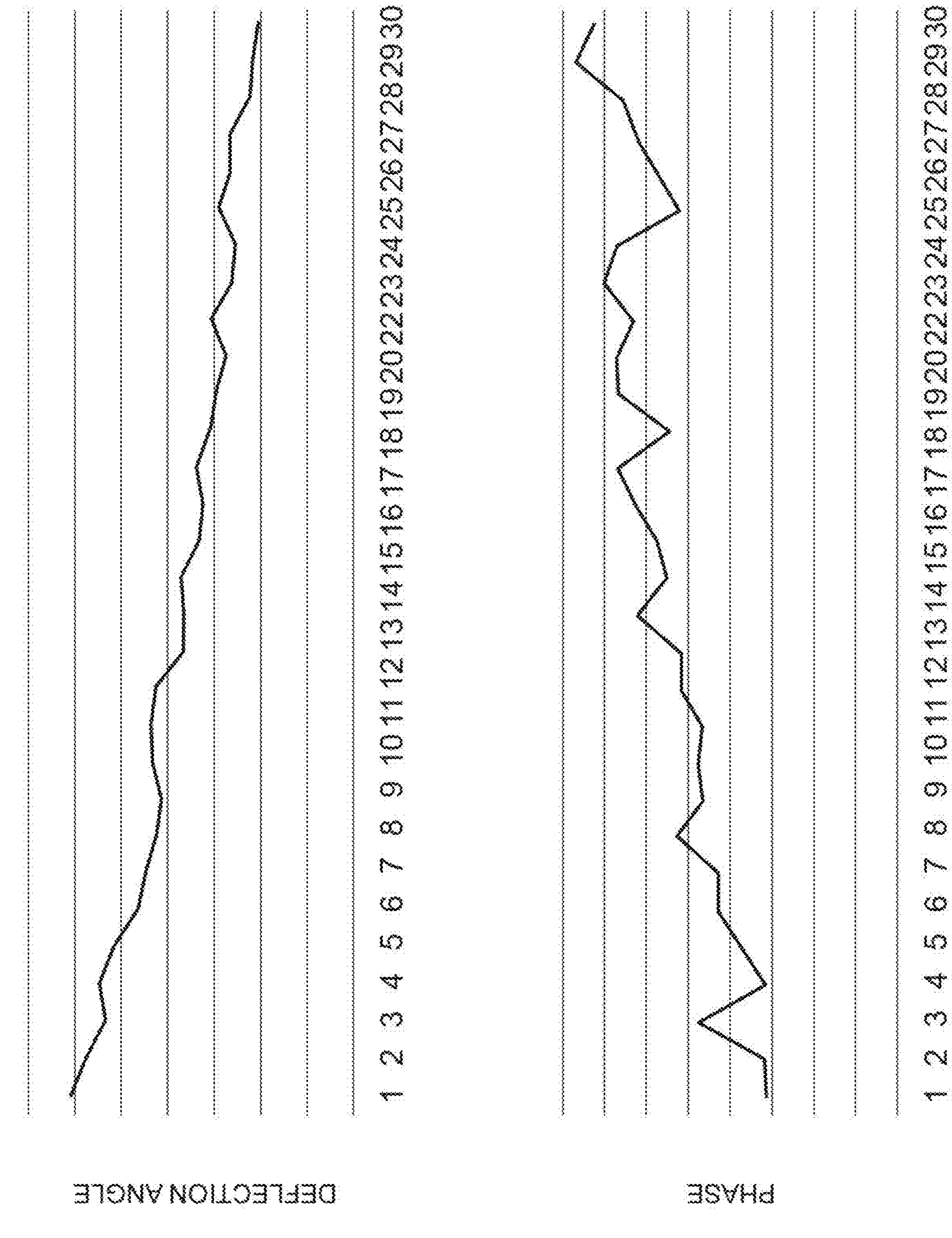
FIG. 8(*a*) is a graph showing changes in the deflection angle of the MEMS mirror over the elapse of usage time, and FIG. 8(*b*) is a graph showing changes in the phase of the MEMS mirror over the elapse of usage time.

On the other hand, the deflection angle (amplitude) and phase of the oscillation of the MEMS mirror 4 may change over the elapse of usage time due to degradation over time or the like. FIGS. 8(*a*) and 8(*b*) show measurement results of the deflection angle and phase when the MEMS mirror 4 is continuously driven with the constant drive signal S1 for one month (30 days). As shown in FIGS. 8(*a*) and 8(*b*), the deflection angle decreases and the phase changes over the elapse of time. When the deflection angle and phase change, there is a concern that the field of view deviates from the effective area A2.

Therefore, in a calibration method for the confocal microscope unit 1 according to the embodiment, the amplitude and the phase of the MEMS mirror 4 are calibrated based on the calibration light from the calibration portion 44. This calibration is executed, for example, each time the confocal microscope unit 1 is started up. During calibration, first, the irradiation light is scanned within the scanning area A1 on the imaging plane FS that is a plane along the frame member 40, using the MEMS mirror 4 (first step). In the first step, the MEMS mirror 4 is driven such that at least a part of the calibration portion 44 is located within the scanning area A1. Subsequent to the first step or simultaneously with the first step, the photodetectors 13*a* to 13*d* are used to detect the calibration light generated from the calibration portion 44 in response to the incidence of the irradiation light (second step). In the second step, it is sufficient that the calibration light is detected by at least one of the photodetectors 13*a* to 13*d*, and as one example, the calibration light may be detected by only the photodetector 13*a*. Subsequently, at least one of the amplitude and the phase of the oscillation of the MEMS mirror 4 is adjusted based on the detection results of the photodetectors 13*a* to 13*d* (third step).

Figure 9:
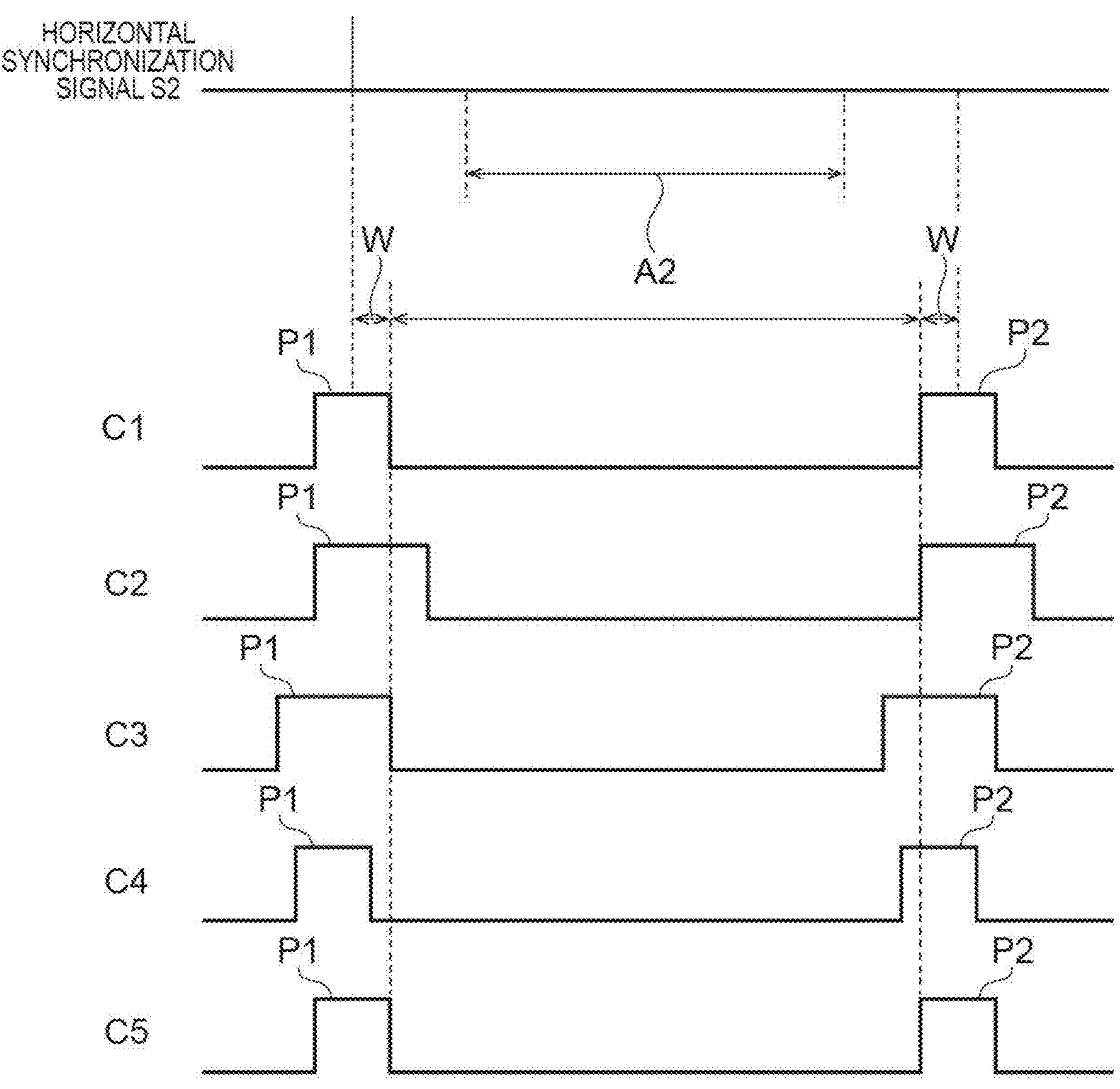
FIG. 9 is a view for describing a method for calibrating the amplitude and the phase of the MEMS mirror.

Here, an example of a method for adjusting the amplitude and the phase of the oscillation of the MEMS mirror 4 based on intensity signals of the calibration light that are the detection results of the photodetectors 13*a* to 13*d* will be described with reference to FIG. 9. The horizontal synchronization signal S2 and the effective area A2 are shown at an upper part of FIG. 9. In addition, examples of intensity signals of the calibration light in states C1 to C5 are shown. A pulse P1 is formed by calibration light from the first calibration portion 44*a*, and a pulse P2 is formed by calibration light from the second calibration portion 44*b*. The state C1 is a proper state (target state), for example, a state immediately after the drive signal S1 is adjusted during manufacturing.

As one example, it is assumed that the intensity signal in the state C2 is detected. In the state C2, both the deflection angle and phase of the MEMS mirror 4 are deviated from the state C1. The deflection angle of the MEMS mirror 4 corresponds to a distance between the pulses P1 and P2, and the phase of the MEMS mirror 4 corresponds to the rising positions of the pulses P1 and P2. First, the phase of the drive signal S1 is changed to align the rising position of the pulse P1 with a position in the state C1 as shown in the state C3. Subsequently, the amplitude of the drive signal S1 is changed to align the distance between the pulses P1 and P2 with a distance in the state C1 as shown in the state C4.

Subsequently, the phase of the drive signal S1 is changed again to align the rising position of the pulse P1 with the position in the state C1 as shown in the state C5. Through the above steps, the deflection angle and phase of the MEMS mirror 4 can be adjusted (calibrated) to the same state as the state C1 that is a target state. In this calibration, adjustment is executed such that a width W between the rising positions of the pulses P1 and P2 and reference positions based on the horizontal synchronization signal S2 coincides with a target value (stored value stored as a target value during manufacturing).

[Functions and Effects]

The confocal microscope unit 1 includes the frame member 40 formed in a frame shape to define the opening 43, and disposed on the microscope optical system R side with respect to the scanning lens 7 such that the irradiation light and the observation light pass through the opening 43. In addition, the frame member 40 includes the first calibration portion 44*a* provided in the first side portion 40*a* defining the opening 43, and generating the calibration light in response to the incidence of the irradiation light. Accordingly, for example, the irradiation light can be scanned within the scanning area A1 on the imaging plane FS (plane along the frame member 40) using the MEMS mirror 4, the calibration light generated from the calibration portion 44 in response to the incidence of the irradiation light can be detected using the photodetectors 13*a* to 13*d*, and at least one of the amplitude and the phase of the oscillation of the MEMS mirror 4 can be adjusted based on the detection results of the photodetectors 13*a* to 13*d*. By adjusting (calibrating) the at least one of the amplitude and the phase in such a manner, the occurrence of a deviation in the field of view as described above can be suppressed. Therefore, according to the confocal microscope unit 1, the occurrence of a deviation in the field of view can be suppressed.

The calibration portion 44 is formed of a part of the plate member 41 exposed from the opening (exposure opening) 42*a* formed in the covering member 42. Accordingly, an edge of the calibration portion 44 can be satisfactorily detected, and the accuracy of calibration can be improved. In addition, since the opening 42*a* can be accurately formed in the covering member 42, the calibration portion 44 can be accurately formed. Accordingly, the accuracy of calibration can also be improved.

The calibration portion 44 includes the plate member 41 that is a fluorescent member. Accordingly, calibration can be performed in the confocal microscope unit 1 for fluorescence observation.

The photodetectors 13*a* to 13*d* detect, as observation light, fluorescence generated from the observation object M in response to irradiation with the irradiation light. Accordingly, fluorescence observation can be performed.

The calibration portion 44 includes the first calibration portion 44*a* provided in the first side portion 40*a*, and the second calibration portion 44*b* provided in the second side portion 40*b*. Accordingly, for example, even when a deviation exists in the disposition of each part due to manufacturing errors or the like, both the amplitude and the phase of the MEMS mirror 4 can be reliably adjusted.

The width of the opening 43 of the frame member 40 is narrower than the width of the scanning area A1. Accordingly, calibration can be performed by locating the calibration portion 44 within the scanning area A1.

The MEMS mirror 4 is configured to be oscillatable around the first axis and the second axis, resonantly operates around the first axis to scan the irradiation light along the first direction D1 within the scanning area A1 on the imaging plane FS (plane along the frame member 40), and rotates around the second axis to change the scanning position in the second direction D2 intersecting the first direction D1. Further, the calibration portion 44 is provided in the first side portion 40*a* extending along the second direction D2. The amplitude and the phase of an oscillation around the first axis (resonance axis) which is for a resonant operation are likely to change; however, in the confocal microscope unit 1, calibration can be performed for scanning by the oscillation around the first axis.

The confocal microscope unit 1 includes the attachment portion 21 for attaching the lens barrel 3 to the connection port PT, and the movable portion 22 supporting the lens barrel 3 such that the angle of the lens barrel 3 with respect to the attachment portion 21 can be changed. Accordingly, by changing the angle of the lens barrel 3 with respect to the attachment portion 21, the optical axis of the scanning lens 7 can be aligned with the direction of the optical axis of the microscope optical system R. As a result, imaging with maintained signal intensity and resolution can be realized.

The frame member 40 is disposed on the imaging plane FS of the microscope optical system R. Accordingly, at least one of the amplitude and the phase of the oscillation of the MEMS mirror 4 can be adjusted by scanning the irradiation light within the scanning area A1 on the imaging plane FS using the MEMS mirror 4.

Modification Examples

Figure 10:
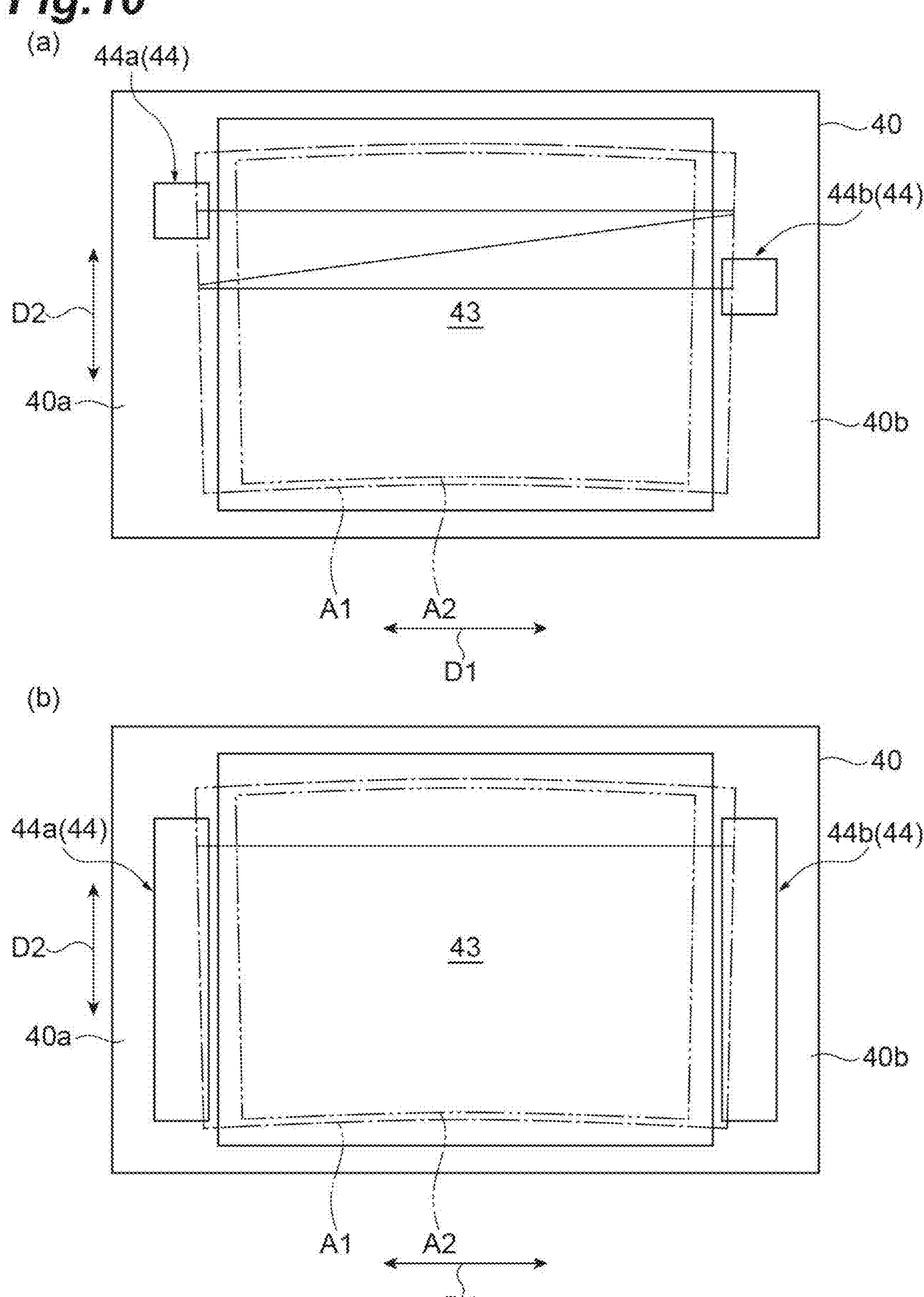
FIG. 10(*a*) is a view showing a first modification example, and FIG. 10(*b*) is a view showing a second modification example.

As in a first modification example shown in FIG. 10(*a*), the first calibration portion 44*a* and the second calibration portion 44*b* may not be located on the same straight line parallel to the first direction D1. Namely, the positions of the first calibration portion 44*a* and the second calibration portion 44*b* in the second direction D2 may be different from each other. In the first modification example as well, similarly to the embodiment, calibration can be performed and the occurrence of a deviation in the field of view can be suppressed.

As in a second modification example shown in FIG. 10(*b*), the first calibration portion 44*a* may extend along an extending direction (second direction D2) of the first side portion 40*a* provided with the first calibration portion 44*a*. Similarly, the second calibration portion 44*b* may extend along an extending direction (second direction D2) of the second side portion 40*b* provided with the second calibration portion 44*b*. In this example, the first calibration portion 44*a* and the second calibration portion 44*b* extend straight along the second direction D2. In this example, each of the first calibration portion 44*a* and the second calibration portion

44*b* is formed in an oblong shape with long sides along the second direction. In the second modification example as well, similarly to the embodiment, calibration can be performed and the occurrence of a deviation in the field of view can be suppressed. In addition, the area that can be calibrated can be widened.

Figure 11:
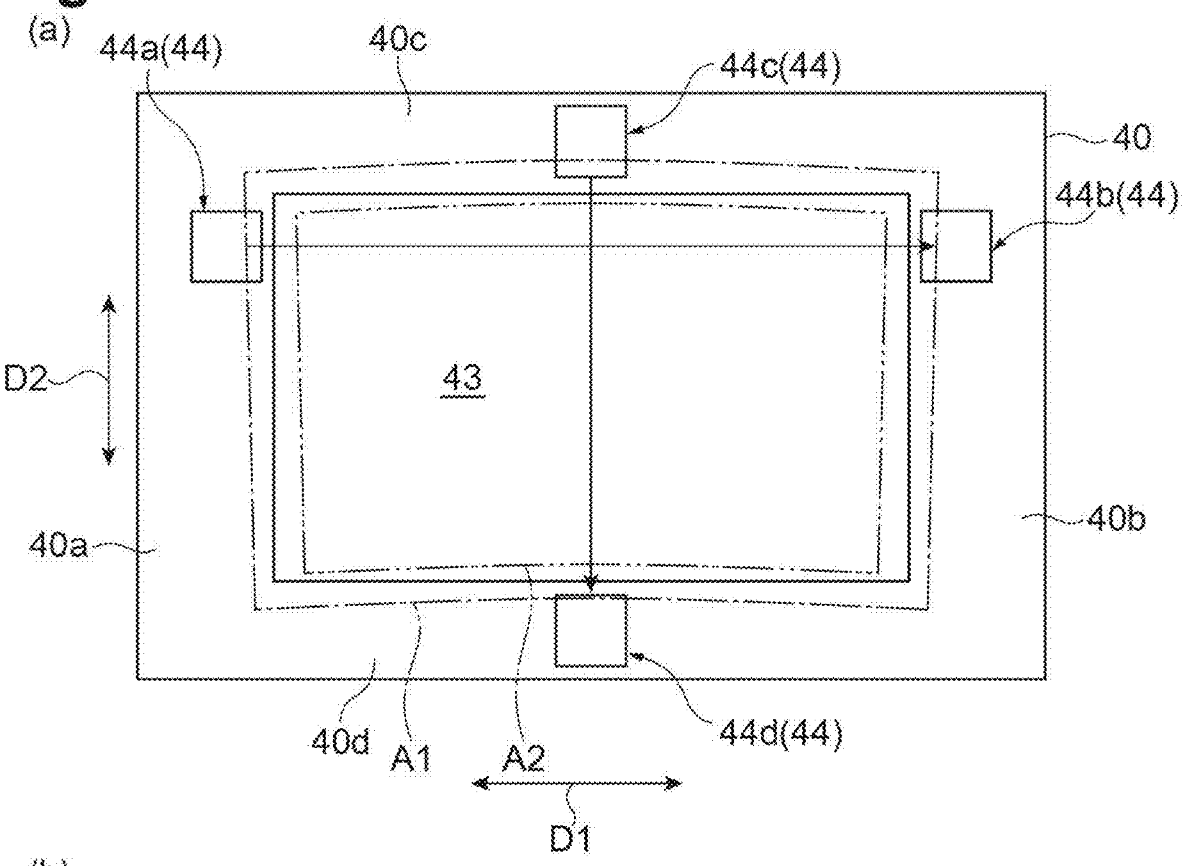
FIG. 11(*a*) is a view showing a third modification example, and FIG. 11(*b*) is a view showing a fourth modification example.
Figure 11:
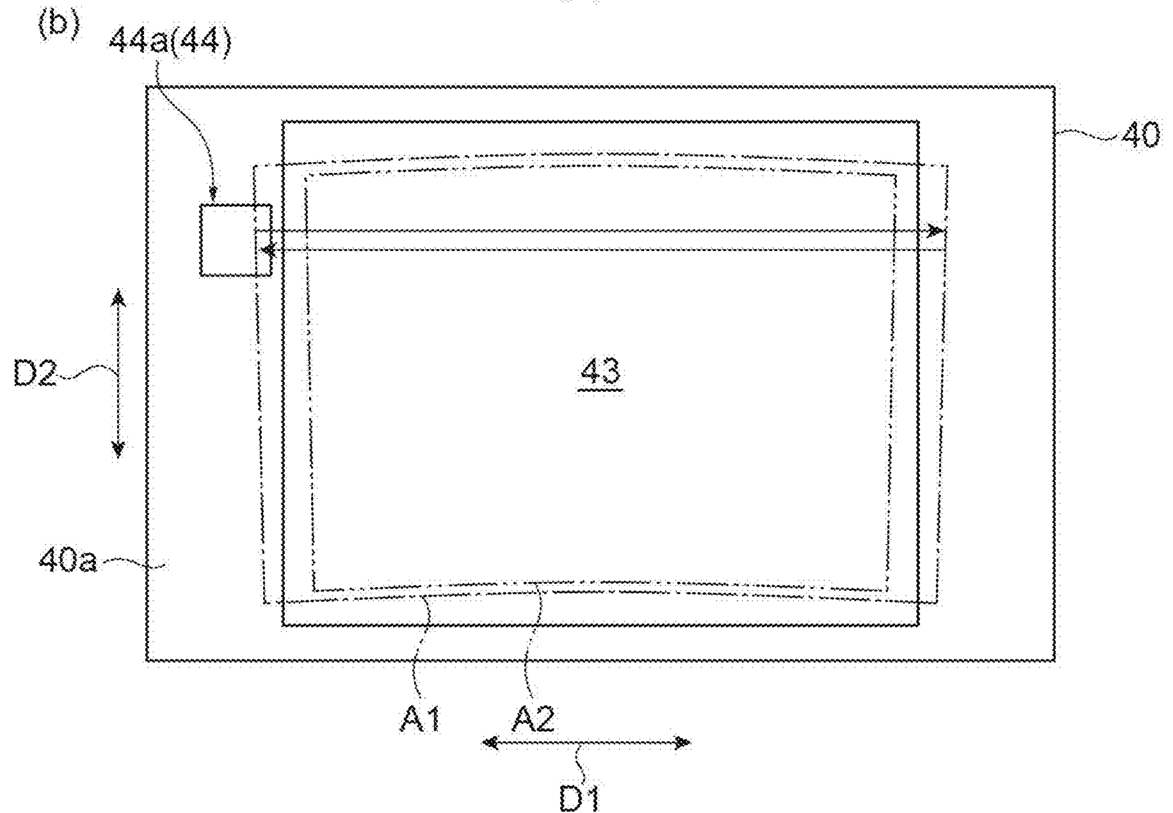

In a third modification example shown in FIG. 11(*a*), the calibration portion 44 further includes a third calibration portion 44*c* provided in the third side portion 40*c*, and a fourth calibration portion 44*d* provided in the fourth side portion 40*d*. The third calibration portion 44*c* and the fourth calibration portion 44*d* are located on the same straight line parallel to the second direction D2. In the third modification example as well, similarly to the embodiment, calibration can be performed and the occurrence of a deviation in the field of view can be suppressed. In addition, not only calibration for scanning along one direction (first direction D1) but also calibration for scanning along a direction intersecting the direction (second direction D2) can be performed.

As in a fourth modification example shown in FIG. 11(*b*), the calibration portion 44 may include only the first calibration portion 44*a*. In the first modification example as well, at least one of the amplitude and the phase of the oscillation of the MEMS mirror 4 can be adjusted, and the occurrence of a deviation in the field of view can be suppressed.

The present disclosure is not limited to the embodiment and the modification examples. For example, the material and the shape of each configuration are not limited to the material and the shape described above, and various materials and shapes can be adopted. In the embodiment, the frame member 40 is disposed on the imaging plane FS of the microscope optical system R; however, it is sufficient that the frame member 40 is disposed along a predetermined plane perpendicular to the optical axis of the scanning lens 7, and the frame member 40 may not be necessarily disposed on the imaging plane FS.

In the embodiment, the calibration portion 44 generates fluorescence in response to the incidence of the irradiation light; however, it is sufficient that the calibration portion 44 generates calibration light including a sensitivity wavelength of at least one of the photodetectors 13*a* to 13*d* such that the calibration light can be detected by the at least one of the photodetectors 13*a* to 13*d*. From a different point of view, it is sufficient that the calibration portion 44 generates calibration light including a wavelength of the observation light.

The observation object M may generate, as observation light, light other than fluorescence in response to the irradiation light. In this case, the calibration portion may also generate light other than fluorescence in response to the irradiation light. The observation light may be reflected light generated from the observation object M in response to irradiation with the irradiation light. The scanning microscope unit of the present invention is not limited to the confocal microscope A, and may be applied to a general fluorescence microscope, a reflection microscope, or the like as long as the microscope is a scanning microscope using a MEMS mirror. The tilt adjustment mechanism 23 may be omitted.

In the embodiment, the pinhole plate is used as an aperture member forming the confocal optical system; however, it is sufficient that the aperture member is an optical element that limits an optical flux, and the aperture member may be, for example, an iris aperture, a fiber core, or the like. In the case of using a fiber output type light source, it is sufficient that the position of an end surface of a fiber core is set as an aperture position (position where an optical flux is limited). A laser light source such as a solid-state laser or a diode laser may be used. In this case, it is sufficient that the position of a beam waist of the laser light source is set as an aperture position, and the light source itself plays the role of an aperture member.

The configurations of the frame member 40 and the calibration portion 44 are not limited to the above-described examples. For example, the calibration portion 44 may be formed of a fluorescent member affixed to a surface of the frame member made of a metal material. The frame member 40 may be integrally formed with the housing that accommodates the scanning lens 7. Namely, the frame member 40 and the housing that accommodates the scanning lens 7 may be formed of one member. For example, the calibration portion 44 may be configured by affixing a fluorescent member to a frame-shaped portion (frame member) defining an opening provided in the housing.

REFERENCE SIGNS LIST

1: confocal microscope unit (scanning microscope unit), 3: lens barrel (housing), 4: MEMS mirror, 7: scanning lens, 10*a* to 10*d*: light source, 13*a* to 13*d*: photodetector, 21: attachment portion, 22: movable portion, 40: frame member, 40*a*: first side portion, 40*b*: second side portion, 40*c*: third side portion, 41: plate member, 42: covering member, 42*a*: opening (exposure opening), 43: opening, 44: calibration portion, 44*a*: first calibration portion, 44*b*: second calibration portion, 44*c*: third calibration portion, 50: microscope, A: confocal microscope (scanning microscope), A1: scanning area, D1: first direction, D2: second direction, FS: imaging plane, M: observation object, PT: connection port, R: microscope optical system.

The invention claimed is:

1. A scanning microscope unit to be attached to a connection port of a microscope including a microscope optical system to form a scanning microscope, the unit comprising:

a light source configured to output irradiation light;

a photodetector configured to detect observation light generated from an observation object in response to irradiation with the irradiation light;

a MEMS mirror configured to scan the irradiation light output from the light source, over the observation object, and for guiding the observation light generated from the observation object in response to the irradiation with the irradiation light, toward the photodetector;

a scanning lens configured to guide the irradiation light scanned by the MEMS mirror, to the microscope optical system, and configured to guide the observation light imaged by the microscope optical system, to the MEMS mirror; and a frame member formed in a frame shape to define an opening, and disposed on a side of the microscope optical system with respect to the scanning lens such that the irradiation light and the observation light pass through the opening, the frame member including a calibration portion provided in a side portion defining the opening, and configured to generate calibration light including a sensitivity wavelength of the photodetector in response to an incidence of the irradiation light, wherein the frame member includes a plate member configured to generate the calibration light in response to the incidence of the irradiation light, and a covering member disposed on the plate member to cover the plate member, and the calibration portion is formed of a part of the plate member exposed from an exposure opening formed in the covering member.

2. The scanning microscope unit according to claim 1, wherein the calibration portion includes a fluorescent member.

3. The scanning microscope unit according to claim 1, wherein the photodetector detects, as the observation light, fluorescence generated from the observation object in response to the irradiation with the irradiation light.

4. The scanning microscope unit according to claim 1, wherein the frame member includes a first side portion and a second side portion facing the first side portion with the opening interposed therebetween, and the calibration portion includes a first calibration portion provided in the first side portion, and a second calibration portion provided in the second side portion.

5. The scanning microscope unit according to claim 1, wherein the calibration portion extends along an extending direction of the side portion.

6. The scanning microscope unit according to claim 1, wherein the frame member includes a first side portion and a third side portion extending along a direction intersecting an extending direction of the first side portion, and the calibration portion includes a first calibration portion provided in the first side portion, and a third calibration portion provided in the third side portion.

7. The scanning microscope unit according to claim 1, wherein the MEMS mirror scans the irradiation light within a scanning area on a plane along the frame member, and a width of the opening of the frame member is narrower than a width of the scanning area.

8. The scanning microscope unit according to claim 1, wherein the MEMS mirror is configured to be oscillatable around a first axis and a second axis, resonantly operates around the first axis to scan the irradiation light along a first direction within a scanning area on a plane along the frame member, and rotates around the second axis to change a scanning position in a second direction intersecting the first direction, and the calibration portion is provided in the side portion extending along the second direction.

9. The scanning microscope unit according to claim 1, further comprising:

a housing to which the scanning lens is fixed;

an attachment portion for attaching the housing to the connection port; and a movable portion for supporting the housing such that an angle of the housing with respect to the attachment portion is changeable.

10. The scanning microscope unit according to claim 1, wherein the frame member is disposed on an imaging plane of the microscope optical system.

11. A scanning microscope comprising:

the scanning microscope unit according to claim 1; and a microscope including the microscope optical system and the connection port.

12. A calibration method for the scanning microscope unit according to claim 1, the method comprising:

a first step of scanning the irradiation light within a scanning area on a plane along the frame member using the MEMS mirror, at least a part of the calibration portion being located within the scanning area;

a second step of detecting the calibration light generated from the calibration portion in response to the incidence of the irradiation light using the photodetector; and a third step of adjusting at least one of an amplitude and a phase of an oscillation of the MEMS mirror based on a detection result of the photodetector.

* * * * *